United States Patent [19]

Umphrey et al.

[11] 4,089,053

[45] May 9, 1978

[54] HOSE AND LINKAGE SUPPORT APPARATUS FOR A SUMP VEHICLE

[75] Inventors: Ronald W. Umphrey, Fairmont; Thomas H. Plate, Morgantown, both of W. Va.; David L. McCain; William T. Sweeney, both of Ponca City, Okla.

[73] Assignee: Continental Oil Company, Ponca City, Okla.

[21] Appl. No.: 797,272

[22] Filed: May 16, 1977

[51] Int. Cl.² .................. B01F 7/02; B01F 15/02; B02C 23/36
[52] U.S. Cl. ...................... 366/349; 366/51; 137/344; 302/14; 241/46.15
[58] Field of Search ............. 259/1 R, 145, 148, 147, 259/151, 153, 161, 169, 6, 10, 41, 46; 137/344; 241/46.15; 417/900; 302/314

[56] References Cited

U.S. PATENT DOCUMENTS

| | | | |
|---|---|---|---|
| 3,231,245 | 1/1966 | Harvey | 259/153 |
| 3,860,175 | 1/1975 | Westerlund | 417/900 |
| 3,931,936 | 1/1976 | Petry | 241/46.15 |
| 3,955,593 | 5/1976 | Umphrey | 137/344 |

Primary Examiner—Robert W. Jenkins
Attorney, Agent, or Firm—William J. Miller

[57] ABSTRACT

A transport vehicle for movement along the surface of the earth has a forward portion with apparatus mounted for mixing dry coal with fluid to form a slurry. The terminus of a cart-supported slurry hose apparatus is connected to the rear portion. A portion of the cart-supported slurry hose apparatus includes linkages which are attached to the rear portion of the transport vehicle. An improvement in the attaching apparatus includes means for pivotally attaching the terminus of the linkage to the vehicle. An arcuate support is attached to the vehicle over the rear end of the vehicle. A coupling is attached between the arcuate support and the linkage to permit the linkage to pivot freely while supporting the linkage from contact with the surface of the earth.

9 Claims, 9 Drawing Figures

HOSE AND LINKAGE SUPPORT APPARATUS FOR A SUMP VEHICLE

BRIEF DESCRIPTION OF THE INVENTION

This invention comprises an improvement on the apparatus for attaching a hose hauler vehicle to a self-propelled mining vehicle which is carrying a sump and may include a pump. The hose hauler vehicle generally includes a plurality of spaced pairs of wheels which are interconnected by links. One or more hoses are supported between the pairs of wheels and clamped to the framework between the wheels and at spaced intervals to the linkage. In order to provide better control over the attachment of the linkage to the transportation vehicle and the hoses to the pump and sump, respectively, an arcuate support rail is mounted at the rear end of the transport vehicle. The arcuate support rail is designed to accommodate rollers which may move along the rail remaining positioned above the linkage when the linkage moves through a horizontal arc as the transport vehicle makes turns or other maneuvers. A support apparatus is attached between the rollers and the linkage so that the linkage is free to move as aforementioned and can be maintained above the surface of the earth, thereby preventing the linkage from digging into the ground causing damage or wear to the linkage. Several embodiments of the arcuate support apparatus are described.

BRIEF DESCRIPTION OF THE PRIOR ART

The best prior art known to applicants is U.S. Pat. No. 3,931,936 issued Jan. 13, 1976, to Eston F. Petry and Ronald W. Umphrey entitled "Apparatus for Crushing Solids in a Liquid Medium". The aforementioned patent is assigned to the same assignee as this application.

In the patent a hopper is illustrated having roll crushers inside the hopper which is adapted to be filled with water. Apparatus is included to maintain the water at a specified level. A transport vehicle is disclosed which mounts the hopper and a pump which is used to move the fluids out of the hopper and into the slurry line. A second line is also attached to the transport vehicle and is connected to the water inlet to the hopper. Suitable motors are provided to drive the pump, the crusher elements, and the transport apparatus on the vehicle. The vehicle also contains suitable electrical and hydraulic circuitry for the necessary operation of the vehicle.

In the above-mentioned vehicle, however, no means were provided for attaching the linkage to the vehicle itself. The slurry hoses from the slurry hose transportation apparatus were physically connected to the slurry and water pipes, respectively. The above-mentioned apparatus provided undue strain on the hoses when the vehicle was advancing, retracting, or making turns.

DETAILED DESCRIPTION OF THE INVENTION

Similar numbers will be used throughout this specification for similar elements.

Figure 1:
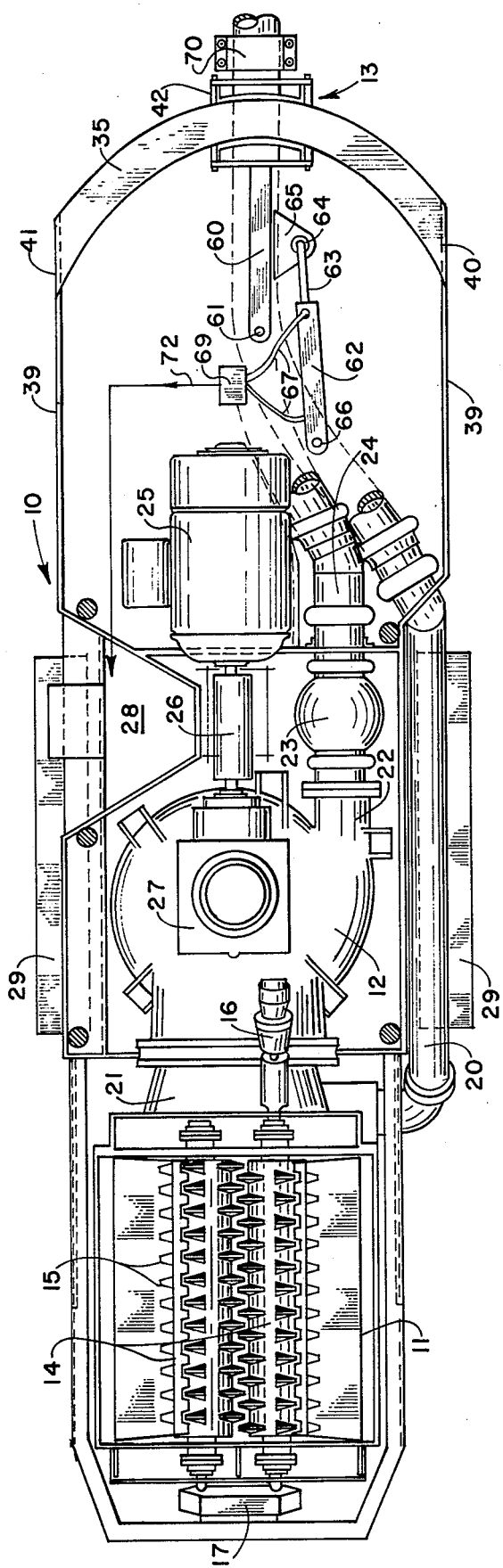
FIG. 1 is a top view of a transport vehicle showing the improved method for supporting and attaching the linkage and slurry hoses.
Figure 2:
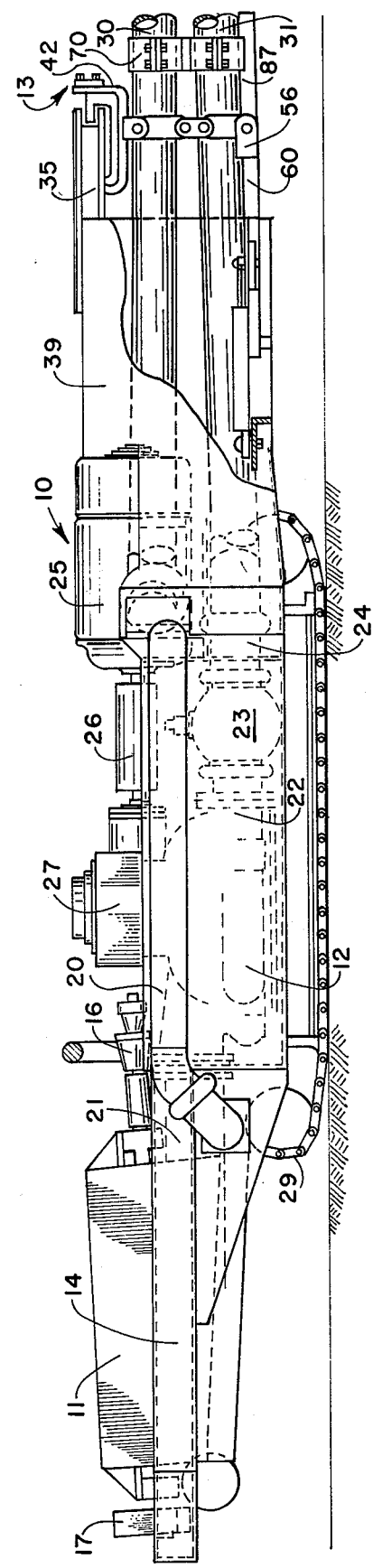
FIG. 2 is a side view of FIG. 1 with a portion of the rear cover removed.

Referring to FIG. 1 a transport vehicle generally referred to by the arrow 10 comprises a sump 11 mounted on the forward portion of transport vehicle 10, a pump 12, and a linkage-support apparatus generally referred to by the arrow 13 mounted at the rear portion of transport vehicle 10. Since the transport vehicle has already been explained as to its function and apparatus in aforementioned U.S. Pat. No. 3,931,936, it will only be generally described in this specification.

Sump 11 contains crusher elements 14 which generally comprise cylindrical rolls which have a plurality of breaker teeth 15 mounted around the periphery of the crusher elements. A hydraulic motor 16 or other type motor drives the crusher elements through a suitable gear box 17. A pipe 20 supplies water to sump 11 at an inlet to the sump (not shown). An outlet 21 from the sump is connected to pump 12 with the outlet 22 of pump 12 connected through valve 23 to the slurry pipe system which is connected at pipe 24 to valve 23. A suitable motor 25 is connected through a coupling 26 to a gear box 27 which drives pump 12. A position 28 is designed to accommodate the operator of the vehicle and contains all the necessary controls, both electrical and hydraulic, for operating the sump and the movement of the vehicle. A suitable track 29 is driven by hydraulic motors (not shown) for forward or rearward movement of the vehicle. It is also understood that the tracks can be selectively or jointly driven to turn the vehicle to maneuver it in any manner necessary to fulfill the use of the device.

The hose 30 for water is coupled to the water pipe 20 and the hose 31 is coupled to pipe 34 which handles the slurry mixture are made of a flexible material, such as steel reinforced rubber. In the prior patent the hoses 30 and 31 were coupled directly to pipes 20 and 24, respectively. This direct coupling caused problems when the vehicle 10 was required to make a turn in a mine passageway. As an example, an excessive strain was put on the hose where it connected to the metal pipe. Furthermore, the excessive strain resulted in the vehicle 10 tending to move toward the mine wall during the turn.

This invention eliminates the aforementioned problems by providing a means for supporting the hose attachment to the transport vehicle 10 and yet permitting freedom of movement of the attachment point during some periods of operation and prepositioning of the attachment point during other periods of operation.

The preferred embodiment is shown in FIGS. 1 through 5 and essentially comprises an arcuate rail 35 which has the general cross-sectional configuration of an "I" beam having a top portion (see FIG. 5) 36, a bottom portion 37, and a center portion 38 interconnecting the top and bottom portion. The arcuate "I"

beam is attached to the vertical side walls 39 at points 40 and 41, respectively, by any suitable means such as welding or riveting.

Figure 4:
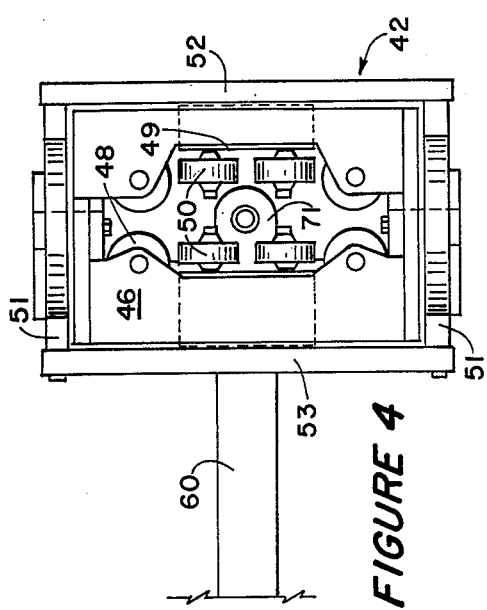
FIG. 4 is a partial top view of the apparatus shown in FIG. 3.
Figure 5:
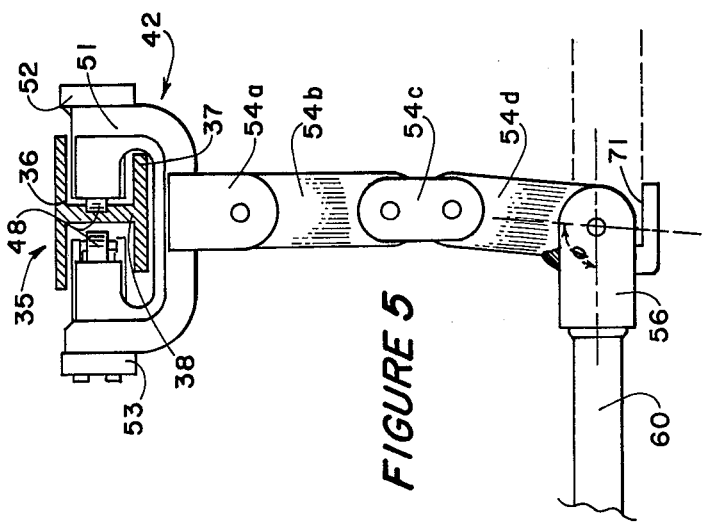
FIG. 5 is a side view of the apparatus shown in FIG. 4.
Figure 3:
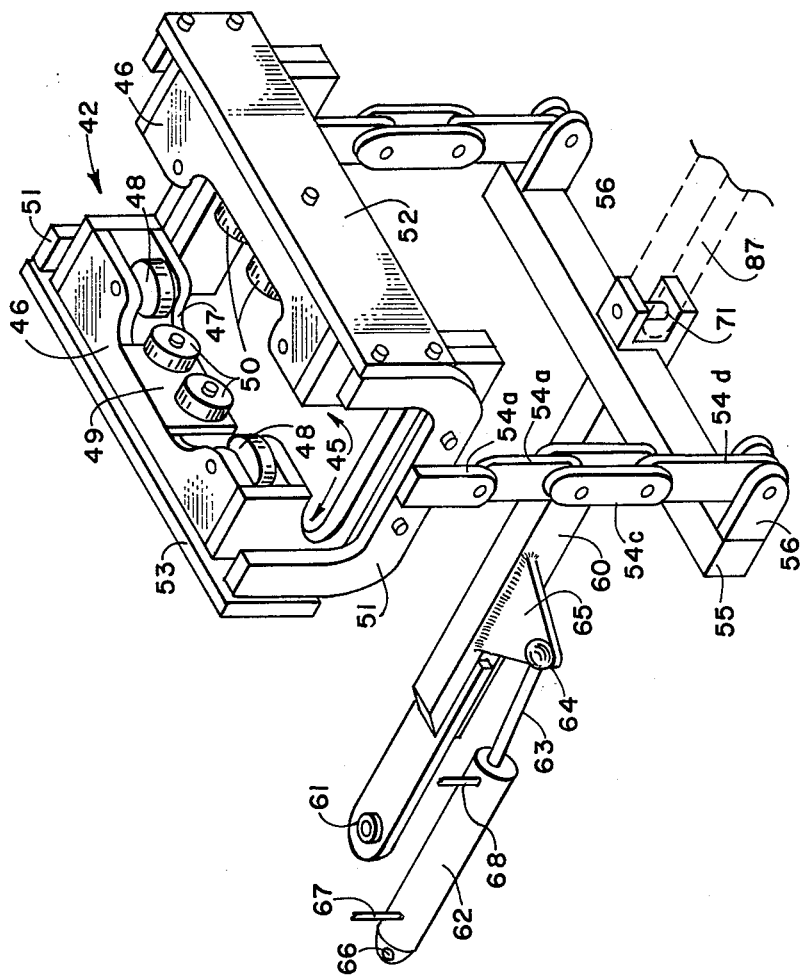
FIG. 3 is an isometric view of one form of linkage-support mechanism.

A carriage, generally referred to by number 42, is better described by referring to FIGS. 3, 4, and 5. Referring to all of the above figures but in particular to FIG. 3, a carriage essentially comprises a metal box 45 having a top 46 and a bottom 47 with vertical axis rollers 48 journaled therebetween and a side portion 49 having horizontal axis rollers 50 journaled therein. Matching boxes 45 with rollers facing each other are mounted between substantially "U" shaped members 51 and attached by side pieces 52 and 53, respectively, to upwardly facing "U" shaped members 51.

A linkage comprising elements 54a, 54b, 54c, and 54d is vertically attached to "U" shaped member 51 at one end and horizontal bar 55 at the other end through a clevis 56. Linkages 54a through 54d are connected at each side of "U" shaped member 51 and bar 55. A solid linkage 60 is attached at one end to bar 55 and at the other end to the transport vehicle 10 through a ball socket joint 61. Ball socket joint 61 will permit vertical and horizontal movement of linkage 60. A positioning hydraulic cylinder 62 has its output mechanical shaft 63 coupled through a bearing 64 to a horizontal bracket 65 which is attached to linkage 60 by welding or any other suitable means. Cylinder 62 is attached through a second ball joint 66 to the transport vehicle 10. Hydraulic tubes 67 and 68 provide either inlets or outlets, respectively, for the hydraulic fluid to the cylinder 62. Tubes 67 and 68 are coupled to a manual control box 69 in the operator's area 28 as illustrated by line 72. Box 69 is coupled to a hydraulic pump and sump (not shown).

Referring to FIG. 5 it should be noted that the last linkage, 54d, is not pivoted for movement vertically to mount 56 but has a limiting angle $\phi$ which is greater than 90° caused by a weld stop 58. This assures that any upward forces on the underside of linkage 60 will cause linkages 54a through 54d to collapse, particularly if the linkage becomes corroded or filled with coal dust. Without the linkage 54d being at an angle, the linkage may, under some conditions, remain rigid, causing undue force on the arcuate "I" beam 35.

Hoses 30 and 31 are normally clamped by means of clamps 70. The entire flexible hose system from the attachment point at clamps 70 is supported by a plurality of wheeled carts interconnected by linkages. These wheeled carts are clearly shown, for example, in U.S. Pat. No. 3,955,593 to Ronald W. Umphrey and David L. McCain.

Basically, the system comprises a cart having spaced wheels and a central portion supporting the wheels axially with a linkage mechanism attached to the central portion which interconnects each of the carts. The number of links interconnecting the carts will depend upon the spacing of the carts. In the apparatus currently considered, five links interconnect each of the carts. The linkages provide a means for pulling the carts which will support the slurry and water hoses without putting undue strain on the hoses themselves. The linkages also assist in conveying the carriages and hoses through a 180° bend. The linkage 60 is coupled through a clevis 71 to a subsequent linkage or linkages to a cart central portion.

Referring to FIG. 5 it can be seen that rollers 48 engage the side of interconnecting portion 38 and rollers 50 engage the top side of bottom 37 under normal operation and roll along the top side of bottom portion 37 as the carriage 42 changes position. Under some conditions it may engage the bottom side of top portion 36.

OPERATION

Figure 6:
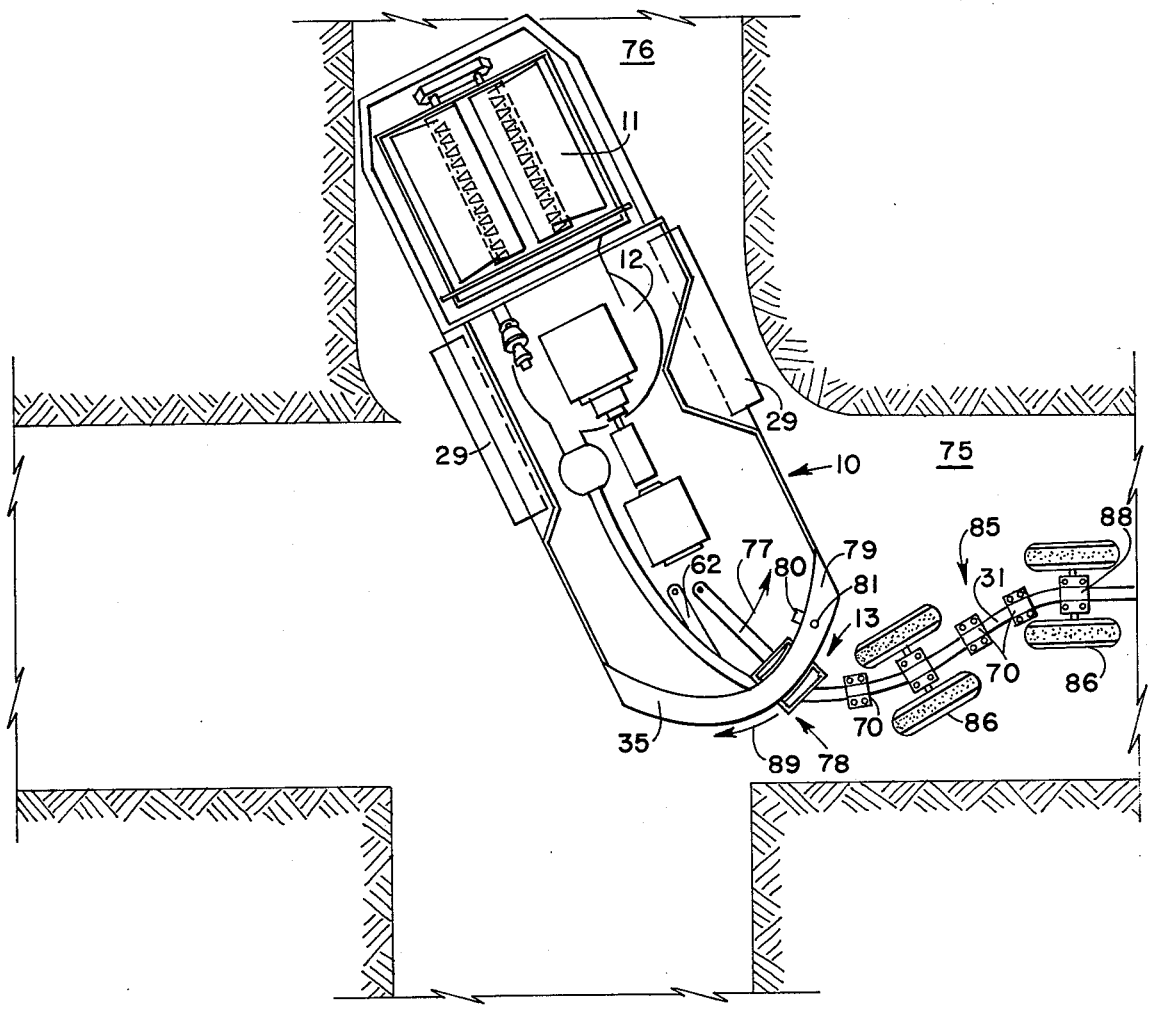
FIG. 6 is a top view illustrating the operation of the apparatus disclosed in FIGS. 1 through 5.

Referring to FIG. 6 a top view of the apparatus shown in FIGS. 1 through 5 is illustrated and pictorially shows a transport vehicle 10 having a hose hauler apparatus attached thereto making a turn from a mine entry 75 into a mine entry 76. As the transport vehicle 10 makes the turn, linkage-support apparatus 13 will begin to swing in the direction of arrow 77. The linkage-support apparatus will swing sufficiently far to prevent kinking of the hoses at point 78. The linkage-support apparatus can move all the way to point 79, if desired.

On some occasions, however, a block or pin 80 or 81, respectively, may be inserted into the arcuate rail to limit the maximum movement of linkage-support apparatus 13. The general reason for limiting the total movement of linkage-support apparatus 13 is to limit the total amount of torque that the hose hauler can apply to the rear portion of the hose hauler vehicle during the turn. Positioning hydraulic cylinder 62 can also be used to lock or limit the movement or to control the rate of movement of linkage-support apparatus 13 at any desired maximum angle with respect to the axis of transport vehicle 10.

Figure 9:
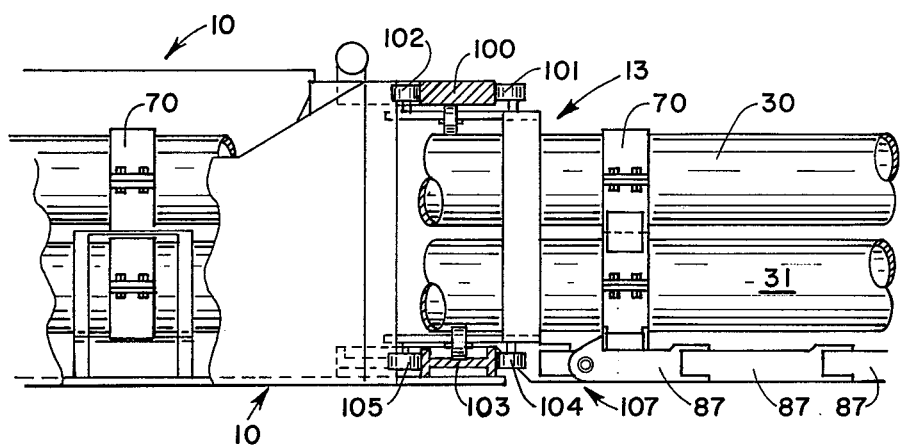
FIG. 9 is a further modification of a linkage-support apparatus.

The hose hauler vehicle referred to generally by number 85 includes a plurality of carts 86 interconnected by linkages 87 which are illustrated in FIG. 9. The hoses 30 and 31 (which lies below 30) are secured by means of a plurality of clamps 70 to the linkages and carts. The entire hose hauler apparatus as previously described has the end links connected to the linkage-support apparatus at clevis 71 with hoses connected to pipes 24 and 20.

On some occasions it is necessary to assist the movement of transport vehicle 10 around the intersection, for example, from passageway 75 to passageway 76. On these occasions the hose hauler apparatus can be inched forward by application of hydraulic pressure to position hydraulic cylinder 62 in a manner to cause movement of linkage-support apparatus 13 in the direction of arrow 89. This movement will take the drag caused by the hose hauler apparatus 85 off the rear of transport vehicle 10, permitting the tracks 29 to push the apparatus forward again.

Alternate Embodiments

Figure 7:
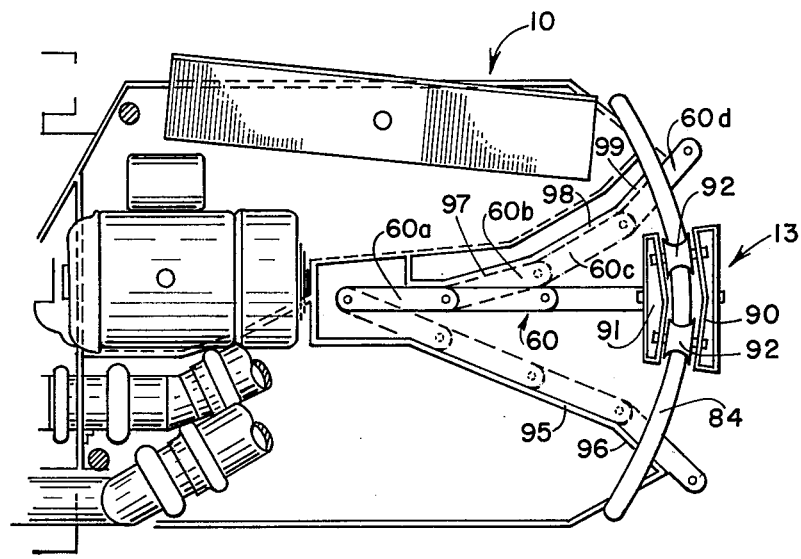
FIG. 7 is a top view of the modified linkage and linkage-supported apparatus.
Figure 8:
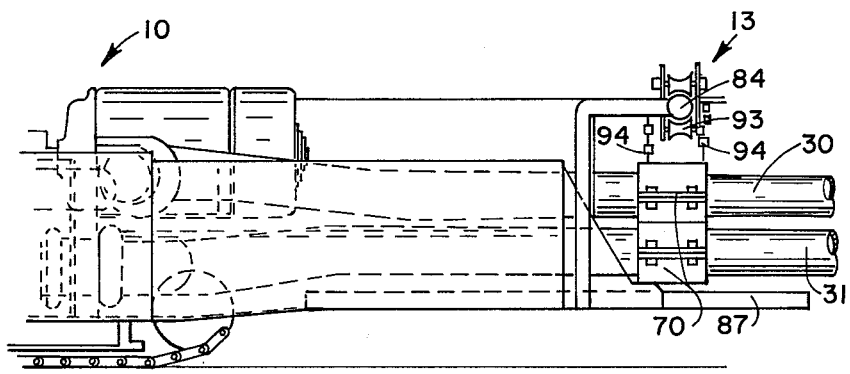
FIG. 8 is a side view of the apparatus shown in FIG. 7.

FIGS. 7 and 8 illustrate another embodiment of the linkage-support apparatus. A pipe arcuate rail 84 is positioned over the rear end of transport vehicle 10 similar to the "I" beam arcuate rail illustrated in FIGS. 1 through 5. The linkage-support apparatus 13 differs in that the sides 90 and 91 journal horizontally positioned rollers 92 which are curved to form over the top of arcuate rail 84. The embodiment illustrated in FIGS. 7 and 8 also includes rollers 93 under a rail 84 to provide a bearing surface when the hoses and linkage 60 may be forced upward. Chains 94 couple the linkage-support apparatus to hose clamps, said hose clamps 70 being mounted or welded to linkage 87. The linkage 60 can be solid as described in FIGS. 1 through 5 or can be segmented into a plurality of sections 60a through 60d. The segmented linkage provides one additional advantage in that, if the side walls are formed of a flat segment 95 and 96 on one side and 97, 98, and 99 on the other side, then the length of the linkage will also substantially match the length of the hose, regardless of the arc the hose must pass through as linkage apparatus 13 moves from either full right to full left along arcuate rail 84. This is particularly necessary when the hoses are mounted to an attachment which is not centered with respect to a vehicle 10.

Another embodiment is illustrated in FIG. 9. This embodiment differs from the previous embodiments by being a rectangular cross-sectional arcuate rail 100 with rollers 101 and 102 engaging each side of the arcuate rail 100 and roller 106b engaging the lower side of rail 100. A second arcuate rail having the shape of an "I" beam 103 is mounted at the bottom of vehicle 10 and has rollers 104, 105, and 106, all of which maintain horizontal and vertical alignment of the linkage-support apparatus 13. Since this embodiment does not contain a linkage 60 which is attached by a ball joint or ball-type bearing 61, a universal joint 107 couples linkages 87 to linkage-support apparatus 13. The universal joint 107 permits both vertical and horizontal movement of linkages 87. While joint 107 is only illustrated in FIG. 9, it is normally used in all the previously described embodiments.

The operation of the embodiments illustrated in FIGS. 7 through 9 is substantially identical with the operation of the device described utilizing FIGS. 1 through 6. The only difference lies in the method for forming the linkage-support apparatus 13 and in the freedom to move vertically.

In all of the embodiments shown in FIGS. 7 through 9, the linkage-support apparatus 13 can be free to move through the entire arc of the rail supporting the support apparatus or the arcuate movement can be blocked to limit the total movement.

It is obvious that other modifications and changes can be made in the method of locking or blocking it or in positioning it and still be within the scope of the invention as described in the specification and the appended claims.

What is claimed is:

1. A transport vehicle for movement along the surface of the earth having a forward portion with apparatus mounted thereon for mixing dry coal with fluid to form a slurry, and a rear portion for attaching the terminus of a cart-supported slurry hose apparatus wherein said cart-supported slurry hose apparatus has linkages interconnecting said carts with the terminus of said linkage attached to said rear portion and means for coupling said fluid coal mixing apparatus to the hose portion of said cart-supported slurry hose apparatus, an improvement in the apparatus for attaching said terminus of the cart-supported slurry hose apparatus to the said rear portion comprising arcuate support means attached to said vehicle at said rear portion and coupling means attached to said arcuate support means to permit said coupling means to move freely along said arcuate means, and means for attaching said linkage means to said coupling means whereby said linkage means is supported vertically and is free to pivot horizontally.

2. An improvement as defined in claim 1 wherein said arcuate support means comprises a beam having a horizontal roller support surface and wherein said coupling means comprises spaced upwardly extending arm means and roller means pivotally attached to said arm means and facing each other, said rollers spaced to ride on the upper side of said roller support surface.

3. An apparatus as defined in claim 2 and additionally including horizontally journaled rollers attached to said upwardly extending arms and positioned to engage said arcuate support means.

4. An apparatus as defined in claim 2 additionally including linkages coupling said upwardly extending arms to said linkage attachment means.

5. An apparatus as defined in claim 4 wherein a portion of said linkage forms an obtuse angle with the linkage attachment means.

6. An apparatus as defined in claim 1 wherein said arcuate support means comprises first and second horizontally and parallelly spaced arcuate tracks, and wherein said coupling means comprises first and second carriages having rollers journaled therein which engage said first and second tracks, respectively, and a coupling means connected between said first and second carriages.

7. A transport vehicle for movement along the surface of the earth having a forward portion with apparatus mounted thereon for mixing dry coal with fluid to form a slurry, and a rear portion for attaching the terminus of a cart-supported slurry hose apparatus wherein said cart-supported slurry hose apparatus has linkages interconnecting said carts with the terminus of said linkage attached to said rear portion and means for coupling said fluid coal mixing apparatus to the hose portion of said cart-supported slurry hose apparatus, an improvement in the apparatus for attaching said terminus of the cart-supported slurry hose apparatus to the said rear portion comprising an arcuate support means horizontally disposed over the rear portion of said transport vehicle, carriage means moveably mounted to said arcuate support means, link means pivotally attached at one end to said transport vehicle and extending under said arcuate support means, coupling means attached between said carriage means and said link means, and means for attaching said linkages to the remaining end of said link means.

8. An apparatus as defined in claim 7 wherein said horizontal support means comprises a beam having a cross-sectional configuration of an "I" and wherein said carriage means includes rollers engaging each side of the top portion of the bottom horizontal member of said "I".

9. An apparatus as defined in claim 7 wherein said horizontal arcuate support means comprises a pipe and wherein said carriage includes concave rollers positioned above and below said pipe.

* * * * *